(12) United States Patent
Goude

(10) Patent No.: US 12,420,608 B2
(45) Date of Patent: Sep. 23, 2025

(54) HEATING, VENTILATION AND/OR AIR-CONDITIONING DEVICE FOR A MOTOR VEHICLE

(71) Applicant: Valeo Systemes Thermiques, La Verriere (FR)

(72) Inventor: Sebastien Goude, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 417 days.

(21) Appl. No.: 17/776,502

(22) PCT Filed: Nov. 10, 2020

(86) PCT No.: PCT/FR2020/052049
§ 371 (c)(1),
(2) Date: Oct. 24, 2022

(87) PCT Pub. No.: WO2021/094680
PCT Pub. Date: May 20, 2021

(65) Prior Publication Data
US 2023/0059258 A1    Feb. 23, 2023

(30) Foreign Application Priority Data
Nov. 15, 2019 (FR) .................................. 1912764

(51) Int. Cl.
*B60H 1/00* (2006.01)

(52) U.S. Cl.
CPC ..... *B60H 1/00021* (2013.01); *B60H 1/00514* (2013.01); *B60H 1/00564* (2013.01);
(Continued)

(58) Field of Classification Search
CPC ............ B60H 1/00021; B60H 1/00514; B60H 1/00564; B60H 1/00471;
(Continued)

(56) References Cited

U.S. PATENT DOCUMENTS 6,139,423 A * 10/2000 Wadey ............... B60H 1/00564
454/71
2005/0075063 A1    4/2005 Ailloud et al.
(Continued)

FOREIGN PATENT DOCUMENTS

CN    105555563 A    5/2016
JP    S57164808 A    10/1982
(Continued)

OTHER PUBLICATIONS

European Patent Office, International Search Report (with English translation) and Written Opinion of corresponding International Application No. PCT/FR2020/052049, dated Feb. 16, 2021.
(Continued)

*Primary Examiner* — Joel M Attey
(74) *Attorney, Agent, or Firm* — Valeo Systemes Thermiques

(57) ABSTRACT

The invention relates to a heating, ventilation and/or air conditioning device for a motor vehicle, having an air inlet box with a plurality of walls and a spiral box arranged downstream of the air inlet box with respect to the flow of an air flow. The air inlet box further includes at least one first air inlet for the entry of a first air flow and at least one second air inlet for the entry of a second air flow. The air inlet box has a first internal duct made of porous material arranged to connect the first air inlet to the inlet of the spiral box.

12 Claims, 3 Drawing Sheets

(52) U.S. Cl.
CPC .............. *B60H 2001/00085* (2013.01); *B60H 2001/00092* (2013.01); *B60H 2001/00135* (2013.01); *B60H 1/00471* (2013.01); *B60H 2001/006* (2013.01)

(58) Field of Classification Search
CPC ........... B60H 2001/00085; B60H 2001/00135; B60H 2001/006; B60H 2001/00092; B60H 2001/00185
USPC .......................................................... 165/42
See application file for complete search history.

(56) References Cited

U.S. PATENT DOCUMENTS

2007/0218824 A1* 9/2007 Bailey ................ B60H 1/00564
454/139

| | | |
|---|---|---|
| 2016/0229258 A1 | 8/2016 | Loup et al. |
| 2020/0164715 A1 | 5/2020 | Brault et al. |
| 2021/0061193 A1* | 3/2021 | Shin .................... B60R 13/0846 |

FOREIGN PATENT DOCUMENTS

| | | |
|---|---|---|
| JP | S6046412 U | 4/1985 |
| JP | S60142111 U | 9/1985 |
| JP | 2504940 B2 | 7/1986 |
| WO | 2018202973 A1 | 11/2018 |

OTHER PUBLICATIONS

China National Intellectual Property Administration (CNIPA), Office Action (with English translation) of corresponding Chinese Patent Application No. 202080079153.3, dated Nov. 12, 2024.

* cited by examiner

HEATING, VENTILATION AND/OR AIR-CONDITIONING DEVICE FOR A MOTOR VEHICLE

CROSS-REFERENCE TO RELATED APPLICATIONS

This application is filed under 35 U.S.C. § 371 U.S. National Phase of International Application No. PCT/FR2020/052049 filed Nov. 20, 2020 (published as WO2021094680), which claims priority benefit to French application No. 1912764 filed on Nov. 15, 2019, the disclosures of which are herein incorporated by reference in their entirety.

TECHNICAL FIELD

The invention relates to the field of heating, ventilation and/or air-conditioning devices for motor vehicles and also to a motor vehicle including such a device.

BACKGROUND OF THE INVENTION

Heating, ventilation and/or air-conditioning devices are subject to strict requirements in terms of unwanted noise. Specifically, these devices include a motor-fan unit (also known as a blower) with a paddle wheel rotated by a motor in order to generate an air stream. The motor-fan unit generates unwanted noise, in particular when the ventilation is set to maximum power, and the noise passes through the air inlet housing and enters the passenger compartment, passing through the air inlet connected to the passenger compartment, which is also called the recirculated air inlet. As a result, a driver or passenger, setting the ventilation to maximum power and in recirculation mode, can hear the motor-fan unit operating, and this can cause unpleasantness and auditory discomfort.

The aim of the invention is in particular to overcome such a drawback.

BRIEF SUMMARY OF THE INVENTION

To this end, the invention proposes a heating, ventilation and/or air-conditioning device for a motor vehicle, including an air inlet housing and a spiral housing arranged at the outlet of the air inlet housing with respect to the flow of an air stream, each housing including a plurality of walls defining an interior volume and a volute, said air inlet housing further including: at least one first air inlet for introducing a first air stream, at least one second air inlet for introducing a second air stream. According to the invention, said air inlet housing includes a first internal duct made of porous material that extends within the volume and is arranged so as to connect the first air inlet to the inlet of the spiral housing.

In this way, the unwanted noise generated by the motor-fan unit remains confined within the air inlet housing. Specifically, an internal duct made of porous material has sound absorption properties and the noise is trapped.

One aspect according to the invention proposes that the second air stream flows from the second air inlet up to the inlet of the spiral housing between the walls of the air inlet housing and the external surface of the first internal duct.

Another aspect according to the invention proposes that a second internal duct made of porous material extends from the second air inlet up to the inlet of the spiral housing.

Another aspect according to the invention proposes that the first and second internal ducts each extend from their respective air inlet up to a junction point where the two internal ducts are connected so as to form only a single duct extending from the junction point up to the inlet of the spiral housing.

Another aspect according to the invention proposes that the porous material corresponds to a polyurethane foam.

Another aspect according to the invention proposes that the first internal duct has a degree of porosity that is different from that of the second internal duct.

Another aspect according to the invention proposes that the air passage section of the first internal duct and/or second internal duct increases progressively in the direction of the inlet of the spiral housing.

Another aspect according to the invention proposes that the air passage section of the first internal duct and/or second internal duct changes progressively from an elliptical shape to a circle shape in the direction of the inlet of the spiral housing.

Another aspect according to the invention proposes that the device further includes a distribution housing arranged downstream of the spiral duct with respect to the flow of an air stream, said distribution housing including at least one heat exchanger and at least one air outlet for distributing the air stream in the direction of a motor vehicle passenger compartment.

The invention also relates to a motor vehicle including a heating, ventilation and/or air-conditioning device as described above.

BRIEF DESCRIPTION OF THE DRAWINGS

Further advantages of the invention will become apparent from reading the following description, with reference to the appended figures, in which.

DETAILED DESCRIPTION OF THE INVENTION

The following embodiments are examples. Although the description refers to one or more embodiments, this does not necessarily mean that each reference relates to the same embodiment, or that the features apply only to a single embodiment. Individual features of different embodiments can also be combined or interchanged to provide other embodiments.

The terms "upstream" and "downstream" are always with reference to the flow of a stream of air circulating within the heating, ventilation and/or air-conditioning device.

Figure 1:
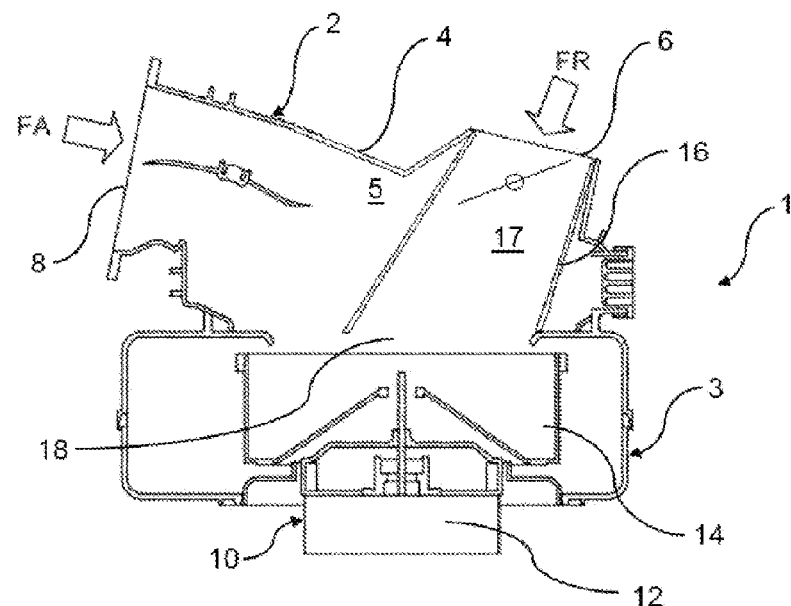
FIG. 1 illustrates a perspective view of the heating, ventilation and/or air-conditioning device according to the invention.

The heating, ventilation and/or air-conditioning device 1 according to the invention and illustrated in FIG. 1 includes an air inlet housing 2 including a plurality of walls 4 defining an interior volume 5 and a spiral housing 3 commonly called a volute also with a plurality of walls defining an interior volume. The device 1, in particular the air inlet housing 2, includes a first air inlet 6 so as to allow a first air stream FR to enter the air inlet housing 2, i.e. the interior volume 5. The device 1, in particular the air inlet housing 2, also includes a second air inlet 8 so as to allow a second air stream FA to enter the air inlet housing 2, i.e. the interior volume 5.

According to the invention, the first air inlet 6 is configured to allow the introduction of a first air stream FR, a recirculated air stream FR, i.e. the air from the passenger compartment. For this purpose, the device 1 can include a duct arranged to connect the passenger compartment to the heating, ventilation and/or air-conditioning device 1. According to the invention, the second air inlet 8 is configured to allow the introduction of a second air stream, a fresh air stream FA, i.e. the air from outside the vehicle. For this purpose, the device 1 can include a duct arranged to connect the outside to the heating, ventilation and/or air-conditioning device 1.

Each air inlet 6, 8 can include a flap that is able to move between a position for closing off the air inlet and an open position for allowing each air stream FR, FA to enter, or not, the interior volume 5 in variable proportions.

The heating, ventilation and/or air-conditioning device 1 also includes a spiral housing 3. The spiral housing 3, which is commonly called a volute, houses a motor-fan unit 10 constituted by a motor 12 and a paddle wheel 14. The motor 12 rotates a transmission shaft that is itself connected to the paddle wheel 14, for example by a hub. The paddle wheel 14 is then driven in rotation thus generating an air stream, the air stream(s) being drawn in an axial direction and then expelled in a radial direction.

The spiral housing 3 is arranged downstream of the air inlet housing 2 with respect to the flow of the air stream so that the motor-fan unit 10 is arranged to draw in the stream of air coming from the first air inlet 6 and/or from the second air inlet 8 and to expel it/them toward a distribution housing 40 that is described below. The air inlet housing 2 and the spiral housing 3 are fluidically connected and include fasteners so that they can be fastened to one another.

The heating, ventilation and/or air-conditioning device 1 also includes a distribution housing 40, including heat exchangers 41. The heat exchangers 41 include a first heat exchanger, for example an evaporator, intended to cool and dehumidify the entire air stream. The heat exchangers 41 also include a second heat exchanger, for example a radiator, intended to cool part of the stream of air circulating in the heating, ventilation and/or air-conditioning device 1, and arranged downstream, relative to the flow of the air stream, of the first heat exchanger. The second heat exchanger can optionally be coupled to an additional electric radiator intended to heat the air stream more quickly, in particular when starting the vehicle. The distribution housing 40 can include at least one air outlet 42 for distributing the air stream in the direction of a motor vehicle passenger compartment.

The motor-fan unit 10 generates unwanted noise, and the sound can pass through the first air inlet 6 and reach the passenger compartment. This results in unpleasantness for the passengers of the vehicle, in particular when the ventilation is set to maximum mode.

The device 1 according to the invention includes a first internal duct 16 made of porous material that extends within the interior volume 5 and is arranged so as to connect the first air inlet 6 to the inlet 18 of the spiral housing 3. Thus, the unwanted noise generated by the motor-fan unit 10 is absorbed by the porous materials, reducing the amount of noise rising through the recirculated air inlet 6 and thus improving passenger comfort. Specifically, the noise cannot pass through the first air inlet 6 without passing through the first internal duct 16.

The first internal duct 16 is made of, or is made from, a porous material. This internal duct corresponds to a cylindrical tube or to a non-cylindrical tube such as for example a truncated hollow cone. The internal duct can be straight, or rectilinear, as in FIG. 1, or can have an elbow as in FIG. 3 with the duct 24 that will be described later.

The first internal duct 16 extends from the first air inlet 6 up to the inlet 18 of the spiral housing 3. The first internal duct 16 defines an interior volume corresponding to an air channel 17 for the flow of an air stream. As illustrated in FIG. 1, the first air stream FR, i.e. the recirculated air stream, enters the housing 2 through the first air inlet 6 directly within the air channel 17 defined by the first internal duct 16. This first air stream FR is then conveyed as far as the inlet 18 of the spiral housing 3 in order to be drawn in axially and then expelled radially by the motor-fan unit 10. The second air stream FA, i.e. the fresh air, enters the housing 2 through the second air inlet 8 directly in the interior volume 5 situated outside the first internal duct 16. This second air stream FA is also conveyed up to the inlet 18 of the spiral housing 3 in order to be drawn in axially and then expelled radially by the motor-fan unit 10. In other words, the second air stream FA flows within the air inlet housing 2 from the second air inlet 8 up to the inlet 18 of the spiral housing 3 between the walls 4 of the air inlet housing 2 and the external surface of the first internal duct 16.

The porous material of the first internal duct 16 can correspond to any soundproofing material having pores such as, for example, polyurethane (PU) foam, open-pore polyester (PPI) foam, polyether foam or else a mixture of these different foams. For example, a PU PPI foam is well suited to such an application.

Figure 2:
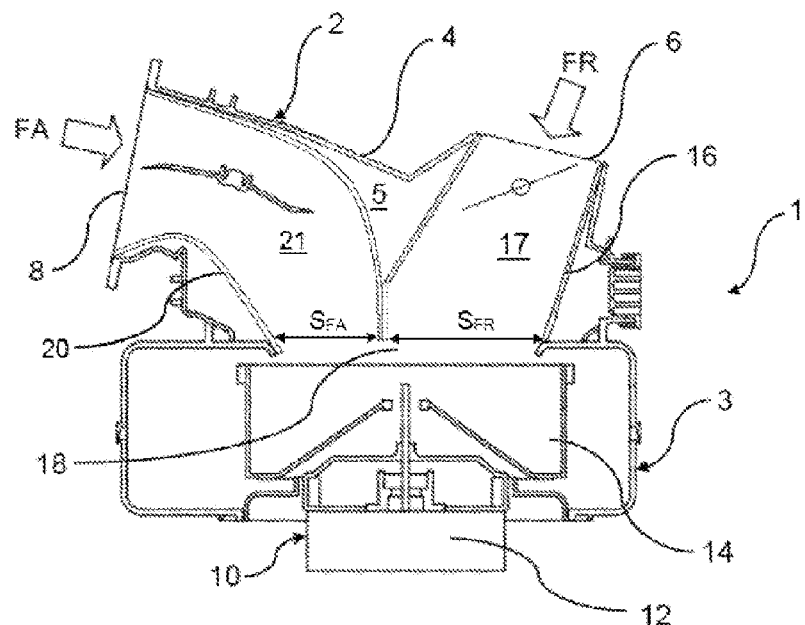
FIG. 2 illustrates a profile view of part of the heating, ventilation and/or air-conditioning device according to the invention.

According to a particular embodiment illustrated in FIG. 2, the device 1 according to the invention further includes a second internal duct 20 also made of porous material that extends from the second air inlet 8 up to the inlet 18 of the spiral housing 3. The second internal duct 20 defines an interior volume corresponding to the air channel 21 for the flow of an air stream. As illustrated in FIG. 2, the second air stream FA, i.e. the fresh air stream, enters the housing 2 through the second air inlet 8 directly within the air channel 21 defined by the second internal duct 20. This second air stream FA is then conveyed up to the inlet 18 of the spiral housing 3 in order to be drawn in axially and then expelled radially by the motor-fan unit 10. The first air stream FR, that is to say the recirculated air, just as for the embodiment illustrated in FIG. 1, enters the housing 2 through the first air inlet 6 directly within the air channel 17 defined by the first internal duct 16 up to the inlet 18 of the spiral housing 3 in order to be drawn in axially and then expelled radially by the motor-fan unit 10.

The porous material of the second internal duct 20 can also correspond to any soundproofing material having pores such as, for example, polyurethane (PU) foam, open-pore polyester (PPI) foam, polyether foam or else a mixture of these different foams. For example, a PU PPI foam is well suited to such an application.

According to the embodiments in FIG. 1 and FIG. 2, at the inlet 18 of the spiral housing 3, the air passage section $S_{FR}$ for the first air stream FR can be larger than the air passage section $S_{FA}$ for the second air stream FA. Given that the recirculated air stream FR is already close to the passenger setpoint temperature, it can prove useful to have a larger air passage section for the recirculated air stream FR in order to reduce the effort provided by the heat exchangers. For example, it can be advantageous for the passage section $S_{FR}$ to occupy between 50% and 90% of the surface of the inlet 18 of the spiral housing 3, for example if it is considered that this inlet 18 is inscribed in a plane.

According to an embodiment that is not illustrated, the passage section $S_{FR}$ occupies 100% of the surface of the inlet 18 of the spiral housing 3. In this case, the spiral housing 3 can include a second inlet connected to the second air inlet 8. It is also possible to envisage a motor-fan unit 10 with two paddle wheels 14, the motor 12 being arranged between the two paddle wheels 14 with an inlet arranged to supply each paddle wheel with air. There can be one inlet for the fresh air stream FA and one inlet for the recirculated air stream FR.

It can also prove advantageous to at least partially fill the interior volume 5 situated between the two internal ducts 16, 20 with a soundproofing material, or even with the same porous material as that constituting the two internal ducts 16, 20.

Although it is easier to use the same porous material for the two internal ducts 16, 20, it can also prove advantageous to use two internal ducts 16, 20 with different materials. Given that the object of the invention relates to noise reduction at the first air inlet 6, it is more beneficial to arrange the first internal duct 16 with a material that is more soundproof than that of the second internal duct 20. For example, the two internal ducts 16, 20 can be made from polyurethane foams with different degrees of porosity.

Figure 3:
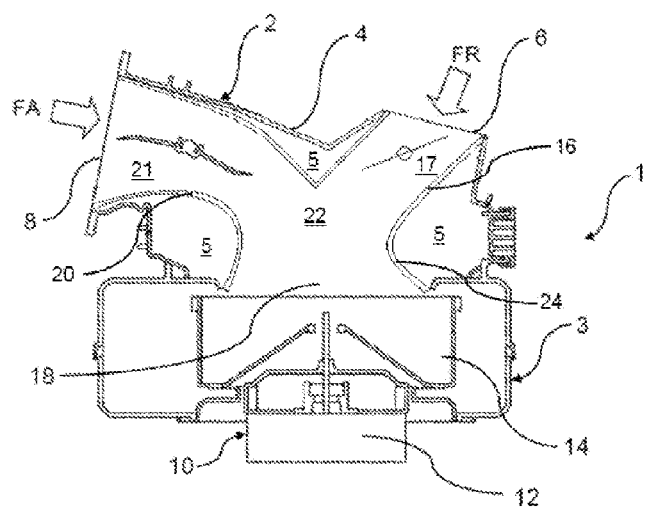
FIG. 3 illustrates a perspective view of part of the heating, ventilation and/or air-conditioning device.
Figure 4:
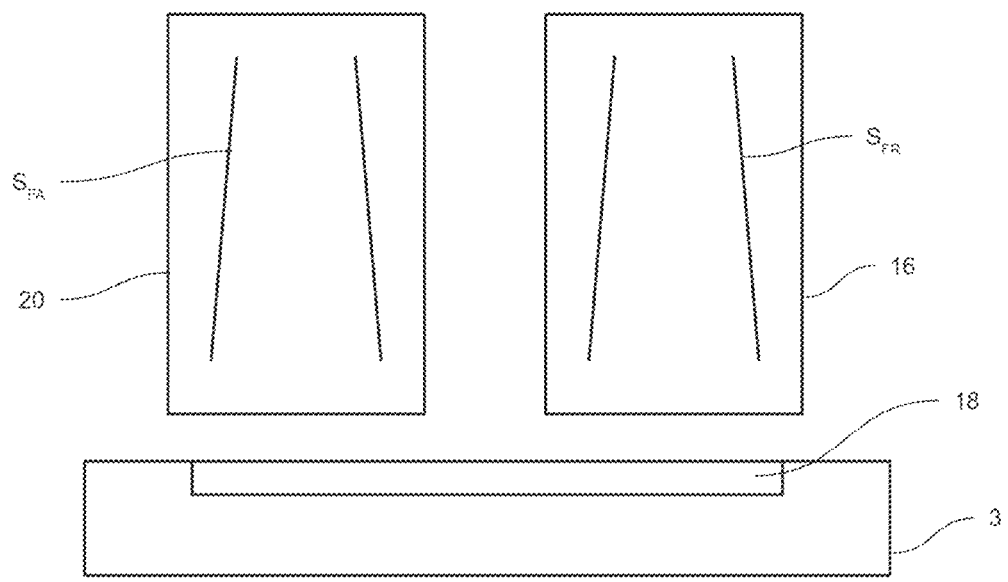
FIG. 4 illustrates a schematic view of part of the heating, ventilation and/or air-conditioning device.
Figure 5:
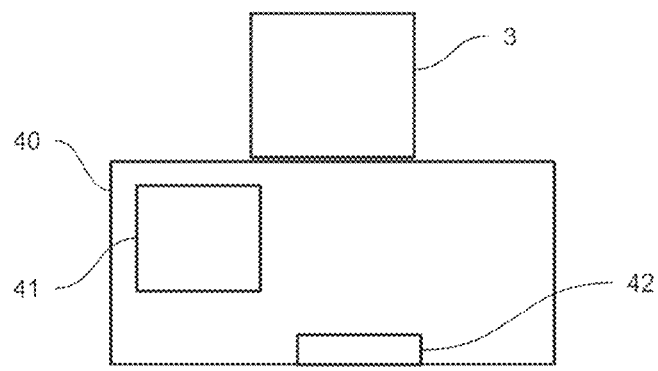
FIG. 5 illustrates a schematic view of another part of the heating, ventilation and/or air-conditioning device.

According to a particular embodiment illustrated in FIG. 3, the first and second internal ducts 16, 20 each extend from their respective air inlet 6, 8 up to a junction point 22 where the two internal ducts 16, 20 are connected, or are united, so as to form only a single duct, a third internal duct 24, extending from the junction point 22 up to the inlet 18 of the spiral housing 3. In this embodiment, the three internal ducts 16, 20, 24 are made from a single porous material, for example polyurethane foam, and in one piece. In other words, they form a single one-piece component. In other words, the first two internal ducts 16, 20 are connected fluidically at a junction point 22. The third internal duct 24 extends from this junction point 22 up to the inlet 18 of the spiral housing 3. In other words, the third internal duct 24 defines a flow channel for a mixture of the first air stream FR and the second air stream FA that are conveyed together from the junction point 22 up to the inlet 18 of the spiral housing 3.

It can also prove advantageous to at least partially fill the interior volume 5 situated between the three internal ducts 16, 20, 24 with a soundproofing material, or even with the same porous material as that constituting the three internal ducts 16, 20, 24.

Whatever the particular embodiments, the device 1 according to the invention can have other features described below.

For example, the air passage section of the first internal duct 16 and/or of the second internal duct 20 and/or of the third duct 24 increases progressively in the direction of the inlet 18 of the spiral housing 3. In other words, the air passage section increases from the air inlet 6, 8, or the junction point 22, up to the air inlet 18 of the spiral housing 3, or the junction point 22, depending on the embodiment. For example, the air passage section can increase by changing from an elliptical section to a circle, or circular, section. In another example, the air passage section can increase by changing from a semi-circle section to a circle, or circular, section. An internal duct 16, 20, 24 with a passage section in the shape of a circle can be widened with a radius that increases as the duct 16, 20, 24 gets close to the inlet 18 of the spiral housing 3.

According to a particular embodiment that is not illustrated, the heating, ventilation and/or air-conditioning device can include an air filter. This air filter can be arranged downstream of the motor-fan unit 10, or else can be arranged only at the second air inlet 8 in order to filter the outside air. The air filter can also be arranged at the inlet 18 of the spiral housing 3 at the outlet of the first internal duct 16, second internal duct 20 and/or third internal duct 24.

The invention also relates to a motor vehicle including a heating, ventilation and/or air-conditioning device 1 as described above.

What is claimed is:

1. A heating, ventilation and/or air-conditioning device for a motor vehicle, comprising an air inlet housing with a plurality of walls and a downstream housing arranged downstream of the air inlet housing with respect to the flow of an air stream, said air inlet housing including:
   at least one first air inlet for introducing a first air stream,
   at least one second air inlet for introducing a second air stream;
with said air inlet housing including a first internal duct made entirely of porous material that is arranged so as to connect the first air inlet to the inlet of the downstream housing.

2. The device as claimed in claim 1, wherein the second air stream flows from the second air inlet up to the inlet of the downstream housing between the walls of the air inlet housing and an external surface of the first internal duct.

3. The device as claimed in claim 1, wherein a second internal duct made of porous material extends from the second air inlet up to the inlet of the spiral housing.

4. The device as claimed in claim 3, wherein the first and second internal ducts each extend from their respective air inlet up to a junction point where the two internal ducts are connected so as to form a single duct extending from the junction point up to the inlet of the spiral housing.

5. The device as claimed in claim 1, wherein the porous material is a polyurethane foam.

6. The device as claimed in claim 3, wherein the first internal duct has a degree of porosity that is different from that of the second internal duct.

7. The device as claimed in claim 3, wherein an air passage section of the first internal duct and the second internal duct increases progressively in the direction of the inlet of the spiral housing.

8. The device as claimed in claim 3, wherein an air passage section of the first internal duct and the second internal duct changes progressively from an elliptical shape to a circle shape in the direction of the inlet of the spiral housing.

9. The device as claimed in claim 1, including a distribution housing arranged downstream of the downstream housing with respect to the flow of the air stream, said distribution housing including at least one heat exchanger and at least one air outlet for distributing the air stream in the direction of a motor vehicle passenger compartment.

10. A motor vehicle, including
   a heating, ventilation and/or air-conditioning device with an air inlet housing with a plurality of walls and a downstream housing arranged downstream of the air inlet housing with respect to the flow of an air stream, said air inlet housing including:
at least one first air inlet for introducing a first air stream,
at least one second air inlet for introducing a second air stream; with said air inlet housing including a first internal duct made entirely of porous material that is arranged so as to connect the first air inlet to the inlet of the downstream housing.

11. The device as claimed in claim 3, wherein an air passage section of the first internal duct or the second internal duct increases progressively in the direction of the inlet of the downstream housing.

12. The device as claimed in claim 3, wherein the air passage section of the first internal duct or the second internal duct changes progressively from an elliptical shape to a circle shape in the direction of the inlet of the spiral housing.

\* \* \* \* \*